United States Patent
Luyten et al.

(10) Patent No.: US 10,876,256 B2
(45) Date of Patent: Dec. 29, 2020

(54) PAPER WITH WATER REPELLENT AND PARTIALLY HEAT SEALING PROPERTIES

(71) Applicant: Topchim NV, Wommelgem (BE)

(72) Inventors: Jan-Pieter Luyten, Wijnegem (BE); Eric Jönsson, Schilde (BE); Dirk Stanssens, Houthalen (BE)

(73) Assignee: Topchim N.V., Wommelgem (BE)

( * ) Notice: Subject to any disclaimer, the term of this patent is extended or adjusted under 35 U.S.C. 154(b) by 35 days.

(21) Appl. No.: 16/320,526

(22) PCT Filed: Jul. 27, 2017

(86) PCT No.: PCT/EP2017/068953
§ 371 (c)(1),
(2) Date: Jan. 25, 2019

(87) PCT Pub. No.: WO2018/019919
PCT Pub. Date: Feb. 1, 2018

(65) Prior Publication Data
US 2019/0271116 A1    Sep. 5, 2019

(30) Foreign Application Priority Data

Jul. 28, 2016 (EP) .................................. 16181749

(51) Int. Cl.
*D21H 21/16* (2006.01)
*C09D 5/00* (2006.01)
(Continued)

(52) U.S. Cl.
CPC ............. *D21H 21/16* (2013.01); *B32B 27/10* (2013.01); *B65D 3/06* (2013.01); *C09D 5/00* (2013.01);
(Continued)

(58) Field of Classification Search
None
See application file for complete search history.

(56) References Cited

U.S. PATENT DOCUMENTS

| | | | | |
|---|---|---|---|---|
| 5,312,868 A | * | 5/1994 | Abe | C08G 18/6225 524/590 |
| 2011/0031156 A1 | * | 2/2011 | Heiskanen | B32B 27/32 206/524.6 |
| 2012/0302660 A1 | * | 11/2012 | Stanssens | C08F 8/32 523/100 |

FOREIGN PATENT DOCUMENTS

| EP | 2682523 A1 | 1/2014 |
|---|---|---|
| JP | 2000109045 A | 4/2000 |

(Continued)

OTHER PUBLICATIONS

International Search Report and Written Opinion, dated Nov. 3, 2017, pertaining to International Application No. PCT/EP2017068953, filed Jul. 27, 2017, 11 pages.

(Continued)

*Primary Examiner* — Dennis R Cordray
(74) *Attorney, Agent, or Firm* — Lorenz & Kopf, LLP

(57) ABSTRACT

The present invention relates to a process for making a heat sealable substrate starting from a water repellent substrate. In particular, the present invention relates to a process for making water repellent paper cups. In particular, the present invention discloses a process for applying one or more heat sealable strips on a water repellent substrate, for example paper or paper board. Further, the present invention also relates to a heat sealable substrate obtained by said process for making paper cups.

20 Claims, 1 Drawing Sheet

(51) Int. Cl.
| | |
|---|---|
| *C09D 125/14* | (2006.01) |
| *C09D 133/04* | (2006.01) |
| *C09D 7/65* | (2018.01) |
| *C09D 7/20* | (2018.01) |
| *D21H 19/22* | (2006.01) |
| *B65D 3/06* | (2006.01) |
| *D21H 23/70* | (2006.01) |
| *D21H 23/00* | (2006.01) |
| *B32B 27/10* | (2006.01) |
| *D21H 27/30* | (2006.01) |

(52) U.S. Cl.
CPC ............... *C09D 7/20* (2018.01); *C09D 7/65* (2018.01); *C09D 125/14* (2013.01); *C09D 133/04* (2013.01); *D21H 19/22* (2013.01); *D21H 23/00* (2013.01); *D21H 23/70* (2013.01); *D21H 27/30* (2013.01)

(56) References Cited

FOREIGN PATENT DOCUMENTS

| | | | |
|---|---|---|---|
| JP | 2004155448 A | 6/2004 | |
| WO | 2008014903 A1 | 2/2008 | |
| WO | 2011110498 A1 | 9/2011 | |

OTHER PUBLICATIONS

Extended European Search Report, dated Jan. 30, 2017, pertaining to EP16181749.9, 7 pages.

* cited by examiner

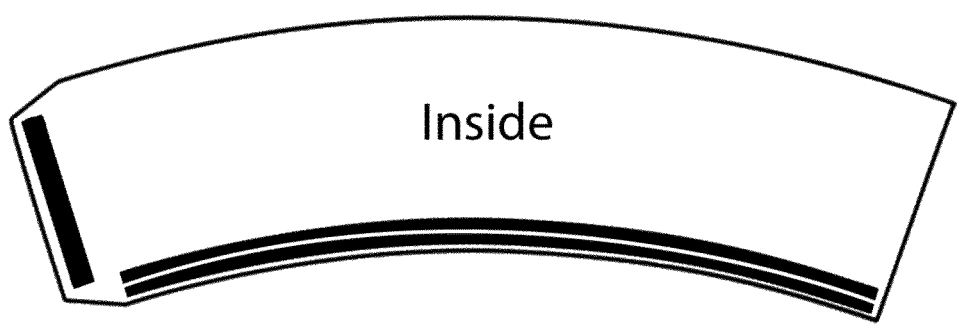
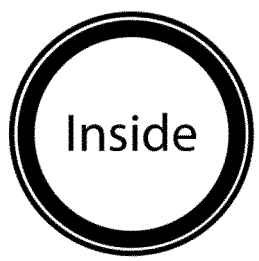
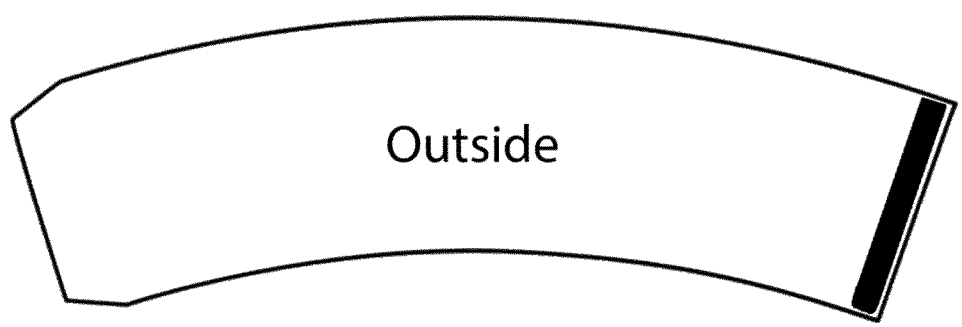
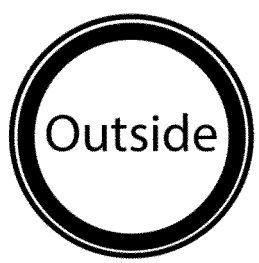

PAPER WITH WATER REPELLENT AND PARTIALLY HEAT SEALING PROPERTIES

FIELD OF THE INVENTION

This invention relates to a process for making a heat sealable substrate starting from a water repellent substrate. In particular, the present invention relates to a process for making water repellent paper cups. The process according to the present invention lowers the coating weight on the substrate since the heat sealable coating layer is applied only on selected areas of the substrate, reduces the need of materials originating from fossil fuel, and improves the recyclability of the paper substrate. As a result, the process according to the present invention results in an increased sustainability profile of the heat sealable and water repellent substrate, and accordingly its resultant end product.

BACKGROUND TO THE INVENTION

Currently, there is a trend in switching from plastic based cups to paper cups because of sustainability and recyclability reasons. Paper and paper board are natural materials derived from trees and hence the materials are abundantly present and are bio-renewable. Furthermore, the materials can, after their use, be recycled to new paper or paper board materials.

However, for use in the manufacture of beverage or food cups, paper has major drawbacks compared to plastic material. It has limited barrier properties and it has no heat sealability properties. To overcome this, the paper used for cups, called cupstock, is nowadays laminated with a plastic foil. Especially polyethylene is used as the laminating material since it has a good resistance against liquids and it has an appropriate melting point. When heated above its melting point, the polyethylene will start to adhere to another substrate once it is pressed to it. For cold cups the polyethylene is laminated on both sides of the cupstock, wherein the outside layer is used as an anti-condense layer. When a cup contains cold liquids water, vapor from the air may condense on the outside of the cup. In the absence of an anti-condense layer the condensed water will be absorbed by the paper of the cup leading to a weakening of the cup.

The polyethylene layer is brought on the cupstock by an extrusion process. It is crucial that the laminated film, especially at the inside of the cup, does not contain any pinholes, so that the liquid in the cups cannot penetrate through the coating layer. To ensure that no pinholes are present, the coating layer should be sufficiently thick. Usually, a layer thickness of at least 15 gram per square meter (gsm) is needed to get a pinhole-free layer and thereby preventing the penetration of the liquid through the coating layer. For the outside layer, a layer of at least 12 gsm is needed to get a full coverage of the cupstock paper. When using lamination, it is not possible to lower the coating weights of the respective coating layers without affecting the good functioning of these layers.

On the other hand, when coating layers are applied from a liquid phase a better coverage can be obtained and hence the coating weights and coating thickness can be reduced. In patent application WO2011110498 a coating layer of 12 gsm is applied at the inside of the cup, while at the outside only 2 gsm is needed as an anti-condense layer. Furthermore, for the inside layer a double coating layer can be applied so that an even better coverage of the cupstock paper is obtained. The 12 gsm for the inside coating layer is needed to obtain a good barrier against liquids but also to obtain the heat sealability. Especially, for obtaining a good sealability a coating layer of at least 10 gsm is needed, while for the barrier lower coating weights might be sufficient. As the coating layer needs to have both good barrier properties and a good heat sealabilty the resultant coating will be a compromise between the two properties.

In the present invention, the water repellent cupstock paper will receive its heat sealing properties only on those places where it is needed. As a result, the cupstock paper will only receive an additional layer of heat sealable material on top of the water repellent coating layer with the barrier properties on those places where the cupstock paper needs to adhere to another piece of cupstock paper.

SUMMARY OF THE INVENTION

The present invention discloses a process for making a heat sealable and water repellent substrate. In particular, the present invention discloses a process for making a heat sealable and water repellent substrate wherein a heat sealable coating layer is applied on selected areas of a water repellent substrate. In a further aspect, the water repellent substrate is paper or paper board. In still a further embodiment, the water repellent substrate is paper or paper board to make cups for liquids.

The present invention is directed to a process for making a heat sealable and water repellent substrate, wherein the heat sealable coating layer is applied on selected areas of the water repellent substrate. In a particular embodiment, the heat sealable coating layer is applied as one or more heat sealable strips on the water repellent substrate. In a particular embodiment, the heat sealable coating layer is applied on the water repellent substrate from a water borne formulation. In another embodiment, the heat sealable coating layer is applied on the water repellent substrate from a solvent borne formulation. In still another embodiment, the heat sealable coating layer is applied on the water repellent substrate from a hot melt formulation.

Typical for the present invention is that the heat sealable coating layer, which is preferably applied from a water borne or solvent borne formulation, can be applied on selected areas of a water repellent substrate. It has surprisingly been found that adhesion of a heat sealable coating layer to a water repellent substrate is optimal when the heat sealable coating layer has a similar surface tension as the water repellent coating layer on the water repellent substrate. Therefore, the composition of the heat sealable coating layer should be selected so that the surface tension of the heat sealable coating layer is similar to the surface tension of the water repellent layer on the substrate. Thus, in a particular embodiment, the heat sealable coating layer in the process according to the present invention has a surface tension that is lower than 30 dynes per cm. In an even further embodiment, the heat sealable coating layer comprises a surfactant or a solvent. Said surfactant or solvent is in particular selected to reduce the surface tension of the heat sealable coating layer below 30 dynes per cm.

In another aspect of the invention, the heat sealable coating layer comprises an adhesive binder. Said adhesive binder is selected from the group comprising styrene butadiene, natural rubber lattices, dispersions of polyacrylate, polystyrene acrylate, polyurethane, polyvinylacetate, polyethylene acetate, polyethylene acrylate, ethylene vinylchloride co-polymers, polyethylene, polypropylene, polyesters, co-polymers of styrene maleic anhydride salts, or mixtures thereof.

As already defined above, it has surprisingly been found that adhesion of a heat sealable coating layer to a water repellent substrate is optimal when the heat sealable coating layer has a similar surface tension as the water repellent coating layer on the water repellent substrate. Therefore, in a further embodiment, the heat sealable coating layer may comprise a surfactant or solvent. The addition of either a surfactant or a solvent reduces the surface tension of the heat sealable coating layer. Since the typically water borne heat sealable coating layer is applied on a water repellent substrate, surface tension of such heat sealable coating layer needs to be lowered to prevent that the heat sealable coating layer will be repelled from the water repellent substrate. As a result, the heat sealable coating layer can be applied on selected areas of the water repellent substrate only. For example, the heat sealable coating layer is typically applied on selected areas of the water repellent substrate and optionally on selected areas of the outside of the cup that match with the selected areas on the inside of the cup.

Therefore, in a particular embodiment, the surfactant or the solvent of the heat sealable coating layer is selected to reduce the surface tension of the heat sealable coating layer below 30 dynes per cm. Said surfactants can be selected from the group comprising non-ionic ethoxylated acetylenic diols, alkyl sulfosuccinates or mixtures thereof. Other suitable surfactants contain siloxane or fluor moieties such as polyether-modified polysiloxane or fluorocarbon-modified polyacrylate. In another embodiment, the solvent is a ketone, in particular methylethylketone. Thus, in a further embodiment, the heat sealable coating layer has a surface tension below 30 dynes per cm.

In an alternative embodiment, the water repellent substrate undergoes partially a corona treatment before the heat sealable coating layer is applied.

In another aspect of the present invention, the heat sealable coating layer comprises a tackifying agent. Tackifying agents are usually resinous materials that help increasing the tack when substrates are brought into contact. This can be especially needed when adhesion on low surface energy or tension substrates is required. Preferably, said tackifying agent is present in an amount between 0.5% and 30%, in particular in an amount between 3% and 20%. Tackifying agents can be selected from the group comprising acrylic emulsions, polyethylene acrylates, rosin resin and its derivatives, low molecular weight polyethylenes.

In a further embodiment, the heat sealable coating layer comprises a plasticizer or a mixture of plasticizers. Plasticizers can be selected from wax dispersions or oil emulsions, for example palm oil, hydrogenated palm oil, soy oil, hydrogenated soy oil, sunflower oil, rapeseed oil, castor oil, tall oil, rosin gum and derivatives. Typically, plasticizers are added in amounts less than 20% of the total coating formulation.

In another embodiment, the heat sealable coating layer comprises pigments or fillers or mixtures of one or both. These additives can be used as anti-blocking agents. Typical pigments and fillers that can be used as $CaCO_3$, clay, talcum, glass beads, iron oxides, carbon black, gypsum.

In yet another embodiment, the heat sealable coating layer comprises a water repellent agent. Said water repellent agent can be selected from the group comprising waxes, paraffins, silicones, vegetable oils.

Typical for the present invention is that the heat sealable coating layer is applied by a printing technique. In another aspect of the present invention, the heat sealable coating layer is applied on the water repellent substrate as a layer of 3 to 20 gram per square meter, preferably as a layer of 4 to 14 gram per square meter.

As indicated above, the present invention relates to a process for making a heat sealable and water repellent substrate wherein a heat sealable coating layer is applied on selected areas of the water repellent substrate. In a particular embodiment of the present invention, said water repellent substrate comprises a water repellent coating layer. In a further embodiment, said water repellent coating layer is applied on the substrate from an aqueous phase. Even more in particular, the aqueous phase of said water repellent coating layer comprises discrete organic particles with a size between 20 and 300 nanometer. Said organic particles contain water repellent additives selected from the list comprising wax, paraffin, silicone, vegetable oil. In a further embodiment, the water repellent coating layer comprises a reaction product of ammonia or an alkylamine with a co-polymer of styrene and maleic anhydride. Further, the water repellent coating layer comprises a co-polymer of cyclic imide and vinylic monomers. In yet another aspect, the water repellent coating layer comprises one or more fillers selected from the list comprising clay, $CaCO_3$, talcum or gypsum.

The present invention also discloses a heat sealable substrate obtained by the process according to the different embodiments as described herein above. In a further embodiment, said heat sealable substrate is for making paper cups, in particular paper cups for liquids.

Numbered embodiments of the present invention are as follows:

1. A process for making a heat sealable and water repellent substrate, said process comprising the step of applying a heat sealable coating layer on a water repellent substrate.
2. The process according to numbered embodiment 1 wherein the water repellent substrate is paper or paper board.
3. The process according to numbered embodiment 1 or 2, wherein the heat sealable coating layer is applied on selected areas of the water repellent substrate.
4. The process according to any one of numbered embodiments 1 to 3, wherein the heat sealable coating layer is applied as one or more heat sealable strips on the water repellent substrate.
5. The process according to numbered embodiment 1, wherein the heat sealable coating layer comprises an adhesive binder that is selected from the group comprising styrene butadiene, natural rubber lattices, dispersions of polyacrylate, polystyrene acrylate, polyurethane, polyvinylacetate, polyethylene acetate, polyethylene acrylate, ethylene vinyl chloride co-polymers, polyethylene, polypropylene, polyesters, co-polymers of styrene maleic anhydride salts, or mixtures thereof.
6. The process according to any one of the preceding numbered embodiments, wherein the heat sealable coating layer comprises a surfactant or a solvent.
7. The process according to numbered embodiment 6, wherein the surfactant or the solvent is selected to reduce the surface tension of the heat sealable coating layer below 30 dynes per cm.
7a. The process according to numbered embodiment 1, wherein the heat sealable coating layer has a surface tension below 30 dynes per cm.
8. The process according to numbered embodiment 6, wherein the surfactant is selected from the group comprising ethoxylated acetylenic diols, alkyl sulfosucccinates or mixtures thereof.

9. The process according to numbered embodiment 6, wherein the surfactant contains siloxane or fluor moieties such as polyether-modified polysiloxane or fluorocarbon-modified polyacrylate.

10. The process according to numbered embodiment 6, wherein the solvent is a ketone.

11. The process according to any one of the preceding numbered embodiments, wherein the heat sealable coating layer comprises a tackifying agent.

12. The process according to numbered embodiment 11 wherein the tackifying agent is present in an amount between 0.5% and 30%, in particular in an amount between 3% and 20%.

13. The process according to any one of the preceding numbered embodiments, wherein the heat sealable coating layer comprises a water repellent agent.

14. The process according to any one of the preceding numbered embodiments, wherein the heat sealable coating layer is applied by a printing technique.

15. The process according to any one of the preceding numbered embodiments, wherein the heat sealable coating layer is applied on the water repellent substrate as a layer of 3 to 20 gram per square meter, preferably as a layer of 4 to 14 gram per square meter.

16. The process according to numbered embodiment 1, wherein the water repellent substrate comprises a water repellent coating layer.

17. The process according to numbered embodiment 16, wherein the water repellent coating layer is applied on the substrate from an aqueous phase.

18. The process according to numbered embodiment 17, wherein the aqueous phase comprises discrete organic particles with a size between 20 and 300 nanometer.

19. The process according to any one of the preceding numbered embodiments 16 to 18, wherein the water repellent coating layer comprises a reaction product of ammonia or an alkylamine with a co-polymer of styrene and maleic anhydride.

20. The process according to any one of the preceding numbered embodiments 16 to 19, wherein the water repellent coating layer comprises a co-polymer of cyclic imide and vinylic monomers.

21. The process according to any one of preceding numbered embodiments 16 to 20 wherein the organic particles contain water repellent additives selected from the list comprising wax, paraffin, silicone, vegetable oil.

22. The process according to any one of the preceding numbered embodiments 16 to 21, wherein the water repellent coating layer comprises one or more fillers selected from the list comprising clay, $CaCO_3$, talcum or gypsum.

23. The process according to numbered embodiment 16 wherein the surface tension of the heat sealable coating layer is similar to the surface tension of the water repellent coating layer.

24. A heat sealable substrate obtained by the process according to any one of the preceding numbered embodiments.

25. The heat sealable substrate according to numbered embodiment 24 for making paper cups.

BRIEF DESCRIPTION OF THE DRAWINGS

With specific reference now to the FIGURES, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

FIG. 1: Schematic drawings of the outside and inside of an opened paperboard of a cup, indicating the areas (in black) on which the heat sealable coating layer is applied.

DETAILED DESCRIPTION OF THE INVENTION

It is thus an object of the present invention to provide a process for making a heat sealable and water repellent substrate by applying a heat sealable coating layer on a water repellent substrate. In particular and typical for the present invention, the heat sealable coating layer is only applied on selected areas of the water repellent substrate and optionally on selected areas of the outside of the cup that match with the selected areas on the inside of the cup, the water repellent substrate. In another embodiment, the heat sealable coating layer is applied as one or more heat sealable strips on the water repellent substrate. As result, a paper or paper board is created that has water repellent properties on its full surface and has heat sealable properties only on those selected areas that need to be sealed to produce the cups. In this way the amount of heat sealable coating product can be drastically reduced and the paper cup can be added to the classical paper waste. This results in a more economic and environmentally friendly production process and end-product. Since the heat sealable coating layer is only applied on those selected areas that need to be sealed, recycling of the cups will be facilitated. After all, the gross part of the substrate according to the present invention is only covered with the water repellent layer. Since this water repellent layer is more easily to be removed from the substrate than a combination of both a water repellent layer and a heat sealable coating layer, the recycling process will be facilitated. Furthermore, since the heat sealable coating layer can be applied on selected areas only, the amount of heat sealable coating layer is drastically reduced resulting in a more economic production process.

Typical for the present invention, is the use of a heat sealable coating layer that can be applied on a water repellent layer or a water repellent substrate, in particular on selected areas of a water repellent layer or water repellent substrate. In general, when a water borne formulation is applied on a water repellent layer, the adhesion of the water borne formulation to the water repellent layer is impaired. Surprisingly, in the present invention, it has been found that the adhesion of a water borne formulation to a water repellent layer or water repellent substrate can be improved by using a water borne formulation that has a similar surface tension as the water repellent layer. Expressed differently, by lowering the surface tension of the water borne heat sealable coating layer, its adherence to a water repellent layer was markedly improved. In order to lower the surface tension of the water borne heat sealable coating layer, the water borne formulation is preferably modified with one or more surfactants or with one or more solvents. Alternatively, the heat sealable coating layer can be applied from a hot melt formulation. As a result, the heat sealable coating layer that is applied in the process for making a heat sealable and water repellent substrate according to the present invention, has a surface tension that is similar to the surface tension as the water repellent layer; in particular the heat sealable coating layer has a surface tension below 30 dynes per cm.

Further, and also typical for the present invention is the use of a heat sealable coating layer that can be applied by a printing technique on a water repellent substrate. Paper with the one-sided or two-sided water repellent layer will accordingly to the present invention be printed to give it its required design but also to provide it with its sealing properties. In other words, the heat sealable layer is applied during the printing process. Said printing can be done by classical printing machines such as off-set, roto-gravure, (rotary) screen printing, flexo printing, ink-jet, laser printing. Usually, the printing equipment has several printing devices next to each other. The devices contain different colours. In the present invention, one or more of these devices are used to print the heat sealable layers on the water repellent substrate. These layers will be printed on those parts where the sealing will take place in the sealing equipment, such as a cup making machine. The printing techniques are so well developed that the heat sealable layers, in particular the heat sealable strips, can be placed exactly where they need to. The printing of the heat sealable strips can take place during the same step when the inks are applied on the paper or it can be done in a separate step, before or after the application of the ink.

The present invention therefore provides a process for making a heat sealable and water repellent substrate wherein a heat sealable coating layer is applied on selected areas of the water repellent substrate. Said heat sealable coating layer comprises an adhesive binder that is selected from the group comprising styrene butadiene, natural rubber lattices, dispersions of polyacrylate, polystyrene acrylate, polyurethane, polyvinylacetate, polyethylene acetate, polyethylene acrylate, ethylene vinyl chloride co-polymers, polyethylene, polypropylene, polyesters, co-polymers of styrene maleic anhydride salts, or mixtures thereof. Preferably, the adhesive binder in the heat sealable coating layer is a combination of polyacrylate, polystyrene acrylate and polyethylene acrylate dispersions. In case polyesters are used, they may be built up with bio-renewable monomers such lactic acid, fatty acids such as stearic acid, palmitic acid and lauric acid, mono propylene glycol, glycerol, succinic acid, itaconic acid, (poly)hydroxyalkanoates. Also polymers such as polyethylene terephthalate, as virgin material or as second life material, can be used as building block for the polyesters. The use of polymers based on these monomers or polymers enhances the sustainability profile of the resultant cups. Furthermore, the recyclability and bio-degradation of the cups will be enhanced by the presence of ester functionalities in the gluing system. After all, during the recycling or bio-degradation process of the cups, hydrolysis of the ester groups will break up the seals of the cups.

In a further preferred embodiment, the heat sealable coating layer comprises a surfactant or a solvent. In one embodiment, the heat sealable coating layer is applied as a water borne formulation, and therefore it will be repelled from the water repellent layer or water repellent substrate. Therefore, such water borne formulation needs to be modified by the presence of surfactants or solvents to reduce the surface tension of the heat sealable coating layer below 30 dynes per cm. Thus, in one embodiment, the heat sealable coating layer has a surface tension below 30 dynes per cm. In a particular embodiment, the heat sealable coating layer comprises a surfactant to lower its surface tension. Typical examples of surfactants are selected from the group comprising non-ionic ethoxylated acetylenic diols, alkyl sulfosuccinates or mixtures thereof. Other suitable surfactants contain siloxane or fluor moieties such as polyether-modified polysiloxane or fluorocarbon-modified polyacrylate. In another embodiment, the heat sealable coating layer comprises a solvent to lower its surface tension. In a more specific embodiment, said solvent is a ketone. In still another embodiment, the water repellent layer or water repellent substrate can undergo partially a corona treatment to reduce its water repellent property. In yet another embodiment, the heat sealable coating layer is applied from a hot melt formulation.

In a further embodiment of the present invention, the heat sealable coating layer comprises a tackifying agent. Tackifiers are usually resinous materials that help increasing the tack when substrates are brought into contact. This can be especially needed when adhesion on low surface energy substrates is required. Examples of tackifiers can be polyacrylate dispersions, polyethylene acrylate dispersions, rosin derivatives, low molecular weight polyethylenes. In a preferred embodiment, the tackifying agent is present in an amount between 0.5% and 30%, in particular in an amount between 3% and 20%.

In another aspect, the heat sealable coating layer also comprises a plasticizer. Plasticizers are products that help flowing the heat sealable material. This is particularly the case when hot melts are used as the gluing system. Plasticizers are products with a low softening point. Preferably, they do not decrease the water repellence of the coating. In the present invention, plasticizers can be selected from wax or oil, for example palm oil, hydrogenated palm oil, soy oil, hydrogenated soy oil, sunflower oil, rapeseed oil, castor oil, tall oil, rosin gum and derivatives. Typically, plasticizers are added in amounts less than 20% of the total coating formulation. In an another embodiment, wax is used as a plasticizer in the heat sealable coating layer of the present invention.

In a further aspect, the heat sealable coating layer also comprises anti-blocking agents, in particular plastic pigments. These anti-blocking agents are organic polymers with a glass transition temperature between 90° C. and 150° C. At temperatures below 90° C., these products will act as anti-blocking agents, while at the heat sealing conditions these anti-blocking agents become soft and they will therefore not hamper the heat sealing process. Even more interesting, is the use of organic polymers with a glass transition temperature between 90° C. and 150° C. that have a reduced density, for example between 0.4 and 0.9 g per cm$^3$. Due to their larger volume per weight, these particles are very effective against blocking. A typical example is the use of polystyrene or co-polymers of styrene, such as styrene acrylic co-polymers, which have hollow spheres. Further, pigments and fillers can also be used as anti-blocking agent, but only to a limited amount. When their content is too high they may disturb the heat sealing process and therefore their amount should preferably be limited to a maximum of 20% of the coating formulation. Typical pigments and fillers that can be use are $CaCO_3$, clay, talcum, glass beads, iron oxides, carbon black or gypsum.

Yet, in another aspect of the present invention, the heat sealable coating layer comprises a water repellent agent. Typical examples of a water repellent agent or hydrophobizing agent are waxes, paraffins, silicones, vegetable oils or cyclic imide containing polymers as described in patent application WO2008014903.

As already detailed above, the heat sealable coating layer is applied on selected areas of the the water repellent substrate by a printing technique. The heat sealable strips can be applied on one side or on both sides of the substrate.

When applied on top of an existing water repellent coating layer, the heat sealable coating layer is applied as a layer of 3 to 20 gsm, preferably as a layer of 4 to 14 gsm. The heat sealable coating layer can also be applied on blank cupstock paper. In that case, the heat sealable coating layer is applied as a layer of 6 to 20 gsm, preferably between 8 and 16 gsm. A smooth paper will require less heat sealable product than a rough paper. In case both sides of the paper are treated with the heat sealable coating layer, the combined weight of the heat sealable coating layer will be between 6 and 20 gsm, preferably between 6 and 15 gsm. It is preferred that both sides of the substrate, in particular paper, are coated with the heat sealable coating layer. In this way the sealing speed and the strength of the seal are enhanced. Further, since it is sufficient to apply the heat sealable coating layer only on selected areas The present invention discloses a process for making a heat sealable and water repellent substrate wherein a heat sealable coating layer is applied on a water repellent substrate. In a particular embodiment of the invention, the water repellent substrate comprises a water repellent coating layer. In a further preferred embodiment, the water repellent coating layer is applied on the substrate from an aqueous phase. Even more preferred, the water repellent coating layer is applied on the substrate from an aqueous phase comprising discrete organic particles with a size between 20 and 300 nanometer. The water repellent coating layer comprises adhesive binders and additives that will provide the water repellence. In a particular embodiment, the water repellent coating layer comprises one or more adhesive binders. Typical examples of adhesive binders are styrene butadiene and natural rubber lattices, dispersions of polyacrylate, polystyrene acrylate, polyurethane, polyvinylacetate, polyethylene acetate, polyethylene acrylate, ethylene vinylchloride co-polymers, polyethylene, polypropylene, polyesters, co-polymers of styrene maleic anhydride salts, starch, proteins, polyvinylalcohol and mixtures thereof. Preferably, adhesive binders are used that have already a good hydrophobic character such as styrene butadiene or natural rubber lattices, dispersions of polyacrylate, polystyrene acrylate, polyurethane, polyvinylacetate, polyethylene acetate, polyethylene acrylate, polyethylene, polypropylene, polyester and mixtures thereof. The use of polyacrylate dispersions is of particular interest as its properties can easily be fine-tuned so that an adhesive binder with the desired properties can be selected. Often a mixture of polyacrylate dispersions can be added.

The one or more adhesive binders of the water repellent coating layer may also be chosen so that they will enhance the overall heat sealability of the cupstock. In this respect an adhesive binder will be chosen having a low glass transition temperature (Tg). Preferably the Tg is between −50° C. and +50° C. However, the lower the Tg is, the more chance there is that the coated paper will block once it is wound on a roll. To prevent that the amount of low Tg binder should be limited to 40%, even more preferable 30%. In case a high amount of low Tg binders is used anti-block agents can be added. Examples of anti-block agent are organic or inorganic pigments.

The binders can also be combined. Especially the combination of binders with a high Tg and one with a low Tg is of particular interest. The binder with the low Tg will enhance the sealability while the one with the high Tg will act as an anti-block agent. It is essential that when the binders are added with each other that the mixture still shows the Tg's of its constituents. A man skilled in the art will be able to select the appropriate binders and to choose the ratio of the binders in respect to their heat sealing and anti-blocking capacities. The products that provide the water repellence may be the classical hydrophobizing agents such as waxes, parafins, silicones, vegetable oils. Preferably, these additives are first emulsified before they are added to the binder so that they are better distributed in the resultant coating.

In a preferred embodiment of the invention co-polymers of cyclic imide with vinyl monomers are used as water repellent agents. More preferably these polymers are discrete particles and they encapsulate oils or waxes. Such particles have been described in patent application WO2008014903. In a more preferred embodiment of this invention the particles have a size between 20 and 300 nanometer. The particles may also be precipitated on carriers such as has been described in the same patent application. A big advantage of these particles is that only small amounts are necessary to obtain sufficient water repellent properties. Dependent on the purpose of the cups and on the layer thickness of the water repellant barrier layer, the amount of cyclic imide containing polymers as described in patent application WO200801493 may range between 2 to 90%, preferably between 5 and 40%. Furthermore, the polymers have a high Tg, above 100° C., so that they can withstand hot liquids without deformation. The encapsulated oils or waxes will stay in the nano-particles, even at elevated temperatures. When non-encapsulated waxes, oils, silicones and paraffins are used they may leak out of the coating and migrate into the liquid of the cup, especially when the liquid is hot.

The water repellent coating formulation may further contain fillers, wetting agents, dispersing agents, opacifiers, crosslinkers, dyes or pigments. As this coating layer does not need heat sealing properties, as is the case in WO2011110498, a high amount of fillers can be added. Typical fillers are clay, CaCO3, talcum and gypsum. These fillers are not derived from an exhaustive source such as mineral oil and therefore the fillers contribute to a better sustainability profile of the coating. Furthermore, a reduced amount of binder will facilitate the repulpability of the coating. The fillers can be present in a ratio from 0 to 80%, preferably from 0 to 70%.

The aqueous water repellent coating formulation can be applied on the paper by an on-line or an off-line coating machine. Preferably, this is done by an on-line machine as this saves transport and handling costs. Several coating techniques can be used such as the use of a blade, rod, air knife or curtain coater. Also a film press or a size press can be used to apply the coating. Any other printing technique as described above can also be used.

The water repellent coating layer can be applied on one side of the paper or on both sides. When applied on both sides the coating weight can be different and will depend on its purpose. For the inside of a cup a coating layer between 2 and 20 gsm dry weight, preferably between 4 and 12 gsm dry weight will be applied. For the outside of a cold cup a coating layer between 0.5 and 5 gsm, preferably between 0.8 and 3 gsm is applied. For hot cups, usually no water repellent coating layer is applied at the outside of the cup.

The paper can have a weight between 26 and 500 gram per square meter (gsm), preferably between 150 and 400 gsm. Especially for cupstock a paper with a weight of at least 150 gsm will be necessary to give it sufficient stiffness. Usually, the paper will contain internal sizing agents such as alkene ketene dimer, alkene succinic anhydride or rosin acid derivatives. This will help the water hold out of the paper.

The invention further provides a heat sealable substrate obtained by the process as outlined herein above. In particular, said heat sealable substrate is for making paper cups.

EXAMPLES

Aqueous Formulations for Water Repellant Coatings
Preparation of Cyclic Imide Containing Polymer with a Paraffin Encapsulated To a 1 litre double walled, oil heated autoclave, having an anchor stirrer, 120 g of a polystyrene maleic anhydride (SMA) (grade: 26080; from Polyscope, the Netherlands) and 400 g of water were added. The SMA had a maleic anhydride content of 26 mole % and a molecular weight of 80.000 g/mole. To this reaction mixture was added 280 g of paraffin wax with a melting point of 57° C. and 21.7 g of a 25% ammonia solution so that the maleic anhydride (MA): $NH_3$ ratio was about 1:1.

The temperature was raised to 160° C. and this temperature was maintained during 4 hours. Thereafter, the reaction mixture was slowly cooled down to room temperature. A polymer dispersion was obtained having a solid content of approximately 57 wt. %, the particle size being between 100 and 140 nm. The pH value was 7.2, indicating an almost complete conversion of the maleic anhydride groups into maleimides.

Formulation for Water Repellant Coating Layer
Coating Formulation 1

100 g dispersion according to example 1 is mixed with 80 g of Orgal P056V (from Organik Kymia), a polyacrylate with a solids content of 50% and a Tg of 10° C. To this mixture is added 60 g of a 60% talcum dispersion.

Formulation for Heat Sealable Strips
Coating Formulation 2

In a closed recipient 100 g Primacor 5980I, a polyethylene acrylate from DOW Chemical, was dispersed in water by treating the polymer at 120° C. with 185 g of water and 0.35 equivalent of ammonia. To this dispersion 44 grams of Mowilith DC (from Celanese) and 8 g of Lumiten 1-SC (From BASF) is added.

Coating Formulation 3

In a closed recipient 100 g Primacor 5980i, a polyethylene acrylate from DOW Chemical, was dispersed in water by treating the polymer at 120° C. with 185 g of water and 0.35 equivalent of ammonia. To this dispersion 72 grams of Mowilith DC (from Celanese), 140 g of the polymer dispersion of example 1, 264 g of Orgal P056V (from Organik Kymia) and 25 g of Lumiten I-SC (From BASF) is added.

Coating Formulation 4

In a closed recipient 100 g Primacor 5980i, a polyethylene acrylate from DOW Chemical, was dispersed in water by treating the polymer at 120° C. with 185 g of water and 0.35 equivalent of ammonia. To this dispersion 79 g of the polymer dispersion of example 1, 141 g of Orgal P056V (from Organik Kymia) and 15 g of Lumiten I-SC (From BASF) is added.

Coating Formulation 5

To 300 g of the polyacrylate Neocryl B300 (DSM, The Netherlands) is added 300 g methylethylketon. The mixture is well stirred till all the polyacrylate is dissolved.

Applied Coating Weights of the Heat Sealable Strips

The coating formulations were applied on Cupforma Natura card board (from StoraEnso), having a weight of 232 gram per square meter (gsm). 10 gsm coating layer of coating formulation 1 was applied on only one side of the cup stock paper. The Cobb1800 value of the coated cup stock amounted to 18. This coating layer provides good water repellence of the cup stock paper.

The heat sealable strips were applied with a small anilox roll (K Lox Proofer from RK Printcoat Systems) which can be used manually. A person skilled in the art can use this anilox roll to coat only on those parts where the sealing will take place (see FIG. 1). One can apply one or more coatings above each other to obtain the coating weight that is indicated in table 1. The strips are applied on the water repellent layer ("inside") and in some cases also on the other side ("outside").

TABLE 1

Applied coating weights and sealability

| | Gsm coated on water repellant layer "Inside" | Gsm coated on non-water repellant layer "Outside" | Sealability |
|---|---|---|---|
| Coating formulation 2 | 12 | 0 | Excellent |
| Coating formulation 2 | 7 | 0 | No seal |
| Coating formulation 2 | 7 | 4 | Excellent |
| Coating formulation 3 | 10 | 0 | Excellent |
| Coating formulation 4 | 10 | 0 | Excellent |
| Coating formulation 5 | 12 | 0 | Excellent |

The cup stock was sealed with the W-300D(A) apparatus from Wu-Hsing Electronics Ltd. All coated papers were sealed within 0.75 seconds at 150 C and 6 bar. Sealability was measured as a function of fiber tear.

It is clear from the examples that it is possible to apply heat sealable strips on top of a water repellent layer. These heat sealable strips can easily seal with each other. In case there is sufficient coating weight on one side (>8 gsm) the heat sealable strip will also seal with a blank paper.

What is claimed is:

1. A process for making a heat sealable and water repellent substrate, said process comprising the step of applying a heat sealable coating layer on a water repellent substrate, wherein the heat sealable coating layer is applied on selected areas of the water repellent substrate such that a total surface area of the heat sealable coating layer is less than 50% of the surface area of the water repellent substrate.

2. The process of claim 1, wherein the heat sealable coating layer comprises an adhesive binder that is selected from the group consisting of styrene butadiene, natural rubber lattices, dispersions of polyacrylate, polystyrene acrylate, polyurethane, polyvinylacetate, polyethylene acetate, polyethylene acrylate, ethylene vinyl chloride co-polymers, polyethylene, polypropylene, polyesters, co-polymers of styrene maleic anhydride salts, and mixtures thereof.

3. The process of claim 1, wherein the heat sealable coating layer comprises a surfactant or a solvent.

4. The process of claim 3, wherein the surfactant or the solvent is selected to reduce the surface tension of the heat sealable coating layer to less than 30 dynes per cm.

5. The process of claim 3, wherein the surfactant or the solvent is selected from the group consisting of non-ionic ethoxylated acetylenic diols, alkyl sulfosuccinates, mixtures of ethoxylated acetylenic diols and alkyl sulfosuccinates, methylethylketone, surfactants comprising siloxane moieties, and surfactants comprising fluor moieties.

6. The process of claim 1, wherein the heat sealable coating layer has a surface tension less than 30 dynes per cm.

7. The process of claim 1, wherein the heat sealable coating layer comprises a tackifying agent that is selected from the group consisting of acrylic emulsions, polyethylene acrylates, rosin resin and its derivatives, and low molecular weight polyethylenes.

8. The process of claim 7, wherein the tackifying agent is present in an amount between 0.5% and 30%.

9. The process of claim 1, wherein the heat sealable coating layer comprises a water repellent agent.

10. The process of claim 1, wherein the heat sealable coating layer is applied by a printing technique.

11. The process of claim 1, wherein the heat sealable coating layer is applied on the water repellent substrate as a layer of 3 to 20 gram per square meter.

12. The process of claim 1, wherein the water repellent substrate comprises a water repellent coating layer.

13. The process of claim 12, wherein the water repellent coating layer is applied on the substrate from an aqueous phase.

14. The process of claim 13, wherein the aqueous phase comprises discrete organic particles with a size between 20 and 300 nanometers.

15. The process of claim 12, wherein the surface tension of the heat sealable coating layer is similar to the surface tension of the water repellent coating layer.

16. A heat sealable substrate obtained by the process according to claim 1.

17. The heat sealable substrate according to claim 16 configured for making paper cups.

18. The process of claim 1, wherein the heat sealable coating layer is applied on the water repellent substrate as a layer of 4 to 14 gram per square meter.

19. The process of claim 1 wherein the heat sealable coating layer is applied on selected areas of the water repellent substrate such that a total surface area of the heat sealable coating layer is less than 20% of the surface area of the water repellent substrate.

20. A process for making a heat sealable and water repellent substrate, said process comprising the step of applying a heat sealable coating layer on a water repellent substrate, wherein the heat sealable coating layer is applied on selected areas of the water repellent substrate, wherein the heat sealable coating layer comprises a surfactant or a solvent selected from the group consisting of non-ionic ethoxylated acetylenic diols, alkyl sulfosuccinates, mixtures of ethoxylated acetylenic diols and alkyl sulfosuccinates, methylethylketone, surfactants comprising siloxane moieties, and surfactants comprising fluor moieties.

* * * * *